US009622520B2

(12) United States Patent
Fenyves (10) Patent No.: US 9,622,520 B2
(45) Date of Patent: Apr. 18, 2017

(54) CRASH PROTECTION SYSTEM

(71) Applicant: Andras Fenyves, Brooklyn, NY (US)

(72) Inventor: Andras Fenyves, Brooklyn, NY (US)

(*) Notice: Subject to any disclaimer, the term of this patent is extended or adjusted under 35 U.S.C. 154(b) by 424 days.

(21) Appl. No.: 14/167,325

(22) Filed: Jan. 29, 2014

(65) Prior Publication Data

US 2014/0230135 A1 Aug. 21, 2014

Related U.S. Application Data

(60) Provisional application No. 61/767,412, filed on Feb. 21, 2013.

(51) Int. Cl.
*B60R 21/16* (2006.01)
*B60R 21/18* (2006.01)
(Continued)

(52) U.S. Cl.
CPC ........ *A41D 13/018* (2013.01); *A62B 35/0012* (2013.01); *B60R 21/16* (2013.01);
(Continued)

(58) Field of Classification Search
CPC .............. A41D 13/018; A41D 260/102; A41D 13/0007; A41D 13/0155; A62B 35/00; A62B 35/04; A62B 35/0006; A62B 35/0012; Y10S 2/03; B62J 27/00; B62J 1/162; B60R 21/231; B60R 2021/23107; B60R 2021/0088; B60R 21/16;
(Continued)

(56) References Cited

U.S. PATENT DOCUMENTS 3,930,667 A * 1/1976 Osuchowski ........ A41D 13/018
2/DIG. 3
4,299,406 A * 11/1981 Thomas .................. B62J 27/00
244/122 AG
(Continued)

FOREIGN PATENT DOCUMENTS

| EP | 2298594 A1 | 3/2011 | |
| FR | 345275 A * | 11/1904 | ............... A62B 1/14 |
| WO | 9811793 A1 | 3/1998 | |

OTHER PUBLICATIONS

Australian Patent Office, Patent Examination Report No. 1 from corresponding Australian patent application, Oct. 18, 2016, 4 pgs.
(Continued)

*Primary Examiner* — Jameson Collier
(74) *Attorney, Agent, or Firm* — Lucas & Mercanti, LLP (57) ABSTRACT

A crash protection system includes a base connectable to a support on an open vehicle or an animal. The base includes a front airbag module arranged proximate a front end of the base and a rear airbag module arranged proximate a rear end of the base. The front airbag module has a front airbag, and the rear airbag module has a rear airbag. The system further includes a belt system having a first belt connectable around a waist of a rider and at least one strap connecting the first belt to the base. A control system includes sensors that are monitored to determine whether a crash situation is present and the control system actuates the front airbag module and the rear airbag module and releases the base from the support when the crash situation is present.

14 Claims, 13 Drawing Sheets

(51) Int. Cl.
| | |
|---|---|
| *B60R 21/20* | (2011.01) |
| *B60R 21/26* | (2011.01) |
| *A41D 13/00* | (2006.01) |
| *A41D 27/26* | (2006.01) |
| *A41D 13/018* | (2006.01) |
| *A62B 35/00* | (2006.01) |
| *B60R 21/231* | (2011.01) |
| *B60R 21/207* | (2006.01) |
| *B60R 21/00* | (2006.01) |

(52) U.S. Cl.
CPC ............ *B60R 21/18* (2013.01); *B60R 21/207* (2013.01); *B60R 21/231* (2013.01); *A41D 2600/102* (2013.01); *B60R 2021/0088* (2013.01); *B60R 2021/23107* (2013.01)

(58) Field of Classification Search
CPC . B60R 21/18; B60R 2021/161; B60R 21/207; B60R 21/2072; B60R 2021/2078; A61B 5/1117; A61B 5/6804; A61B 5/6805; B63C 9/13; B63C 9/155
USPC ..... 2/92, 102, 455, 456, 462, 463, 465, 467, 2/DIG. 3; 280/290, 730.2, 733
See application file for complete search history.

(56) References Cited

U.S. PATENT DOCUMENTS

| | | | |
|---|---|---|---|
| 4,685,151 A | 8/1987 | Kincheloe | |
| 4,825,469 A * | 5/1989 | Kincheloe | A41D 13/018 2/16 |
| 4,826,223 A * | 5/1989 | Geringer | E05C 19/168 292/144 |
| 5,746,442 A * | 5/1998 | Hoyaukin | A41D 13/018 2/456 |
| 5,781,936 A * | 7/1998 | Alaloof | A41D 13/018 2/456 |
| 6,007,090 A | 12/1999 | Hosono et al. | |
| 6,543,054 B2 * | 4/2003 | Gabriel | A41D 11/00 2/1 |
| 6,859,939 B1 * | 3/2005 | Osburn, Sr. | A41D 13/018 128/869 |
| 7,401,364 B2 * | 7/2008 | Goto | A41D 13/018 2/102 |
| 2002/0092088 A1* | 7/2002 | Duhamell | A41D 13/018 2/463 |
| 2003/0222438 A1 | 12/2003 | Nagatsuyu | |
| 2009/0019623 A1 | 1/2009 | Uchida | |
| 2011/0154561 A1* | 6/2011 | Singhal | A41D 13/018 2/455 |
| 2014/0047623 A1* | 2/2014 | Richards | A41D 13/018 2/455 |
| 2014/0123374 A1* | 5/2014 | Gelston | A41D 13/018 2/455 |
| 2016/0000158 A1* | 1/2016 | Davis | A63B 69/18 2/455 |

OTHER PUBLICATIONS

Canadian Intellectual Property Office, Office Action from corresponding Canadian patent application, Jul. 8, 2016, 3 pgs.
European Patent Office, Supplementary European Search Report from corresponding European patent application, October 10, 2016, 6 pgs.

* cited by examiner

CRASH PROTECTION SYSTEM

CROSS-REFERENCE TO RELATED APPLICATIONS

The present application is a non-provisional of U.S. Provisional Patent Application Ser. No. 61/767,412, filed Feb. 21, 2013, and this application is incorporated herein by reference.

BACKGROUND OF THE INVENTION

Field of the Invention

The present invention relates to a protection device for a rider of an open vehicle, such as a motorcycle or snowmobile, or an animal, such as a horse, the protection device cushioning an impact of the rider after ejection from the open vehicle or animal.

Description of Prior Art

Air bag devices are used extensively in automobiles to cushion the impact of a driver or rider in the event that the automobile is involved in a collision. For automobiles, the airbag prevents impacts within the structure of the vehicle. However, a different type of device for cushioning the impact of motorcycle riders during accidents is required because motorcycle riders are easily thrown from or otherwise separated from their vehicles.

U.S. Pat. No. 4,685,151 discloses apparel in the form of a jacket that is inflatable in the event of an accident to protect a motorcycle rider from an impact. Here, the rider is required to wear the jacket to obtain protection.

U.S. Pat. No. 6,007,090 discloses another type of air bag device for a motorcycle in which the air bag is incorporated on the motorcycle. Here the air bag device protects the rider under circumstances limited to a frontal collision. Furthermore, the protection is limited to a limited range of forward thrust of the rider. It is still possible for rider to be thrown from the motorcycle, in which case this prior art air bag device fails to provide adequate protection.

SUMMARY OF THE INVENTION

An object of the present invention is provide an improved system for protecting a rider of an open vehicle or an animal.

Figure 7:
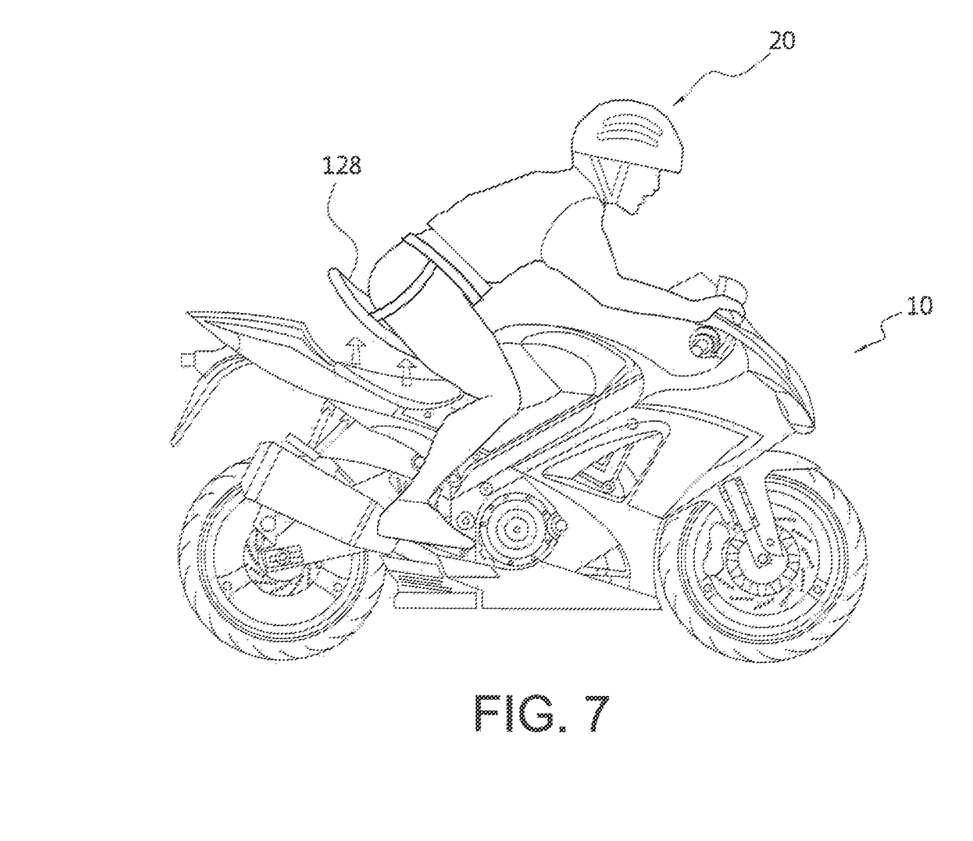
FIG. 7 is a side view of the motorcycle and driver with an ejector actuated.
Figure 8:
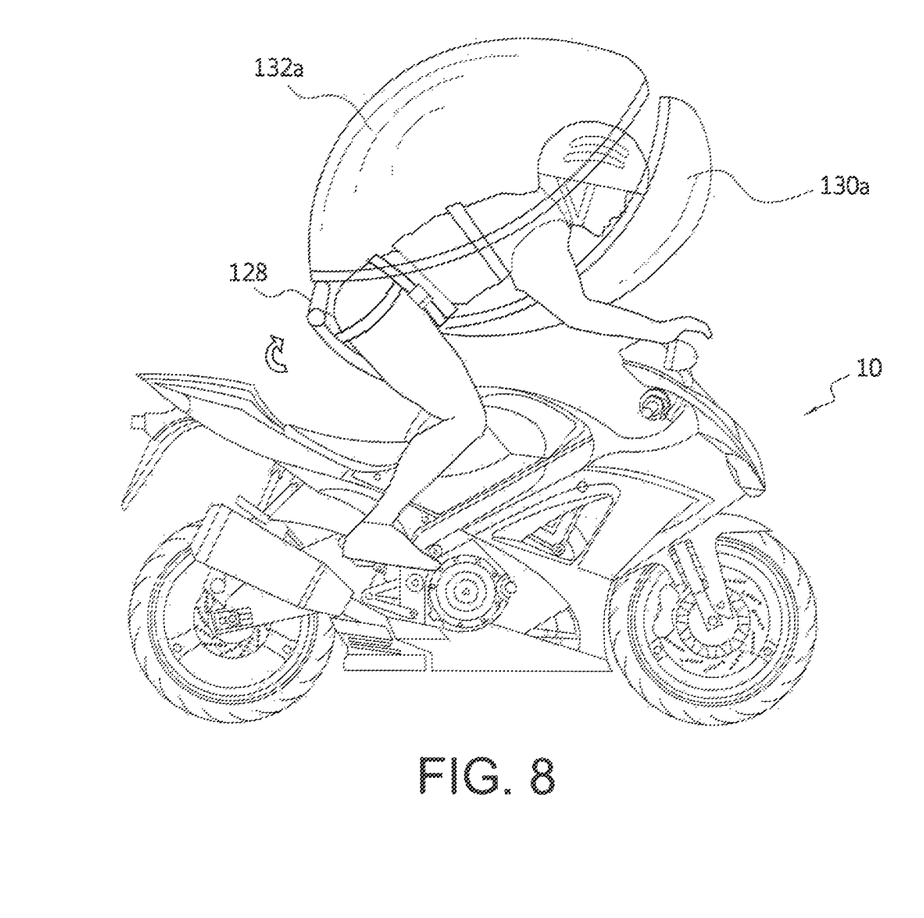
FIG. 8 is a side view of the motorcycle with the upper air bags deployed.

The object is net by a crash protection system including a base connectable to a support on an open vehicle or an animal, a front airbag module arranged proximate a front end of the base and comprising a front airbag, a rear airbag module arranged proximate a rear end of the base and comprising a rear airbag, and a belt system including a first belt connectable around a waist of a rider in an encircling manner as shown at least in FIGS. 7 and 8 and at least one strap connecting said first belt to said base. The crash protection system further includes a control system including sensors. The control system monitors the sensors to determine whether a crash situation is present and the control system actuates the front airbag module and the rear airbag module and releases the base from the support when the crash situation is present.

Thus, according to the present invention, the base is connected to the rider and the base is released from the open vehicle or animal when a crash situation is detected. The base includes the airbags that are deployed to protect the rider.

According to an embodiment of the invention, the front airbag is deployed upward from the base and in front of the rider when the front airbag module is actuated, and the rear airbag is deployed upward from said base and in back of the rider when the front airbag is actuated.

According to a further embodiment, the front airbag is deployed downward from said base and in front of the rider when the front airbag module is actuated, and said rear airbag is deployed downward from said base and in back of the rider when the rear airbag module is actuated.

According to another embodiment of the present invention, the first belt includes a front first belt portion and a rear first belt portion that are connectable by a right fastener and a left fastener, which the rider fastens once the rider is in position on the base. The front first belt portion is connected to the base by a right front strap and a left front strap, and the rear first belt portion is connected to the base by a right rear strap and a left rear strap. The right fastener is arranged between the right front strap and the right rear strap on the right side of the base and the left fastener is arranged between the left front strap and the left rear strap on the left side of the base.

The crash protection system may further include an upper outer belt comprising a front left upper outer belt connected to a left side of the front airbag and the left fastener, front right upper outer belt connected to a right side of the front airbag and the right fastener, a rear left upper outer belt connected to a left side of the rear airbag and the left fastener, and a rear right upper outer belt connected to a right side f the rear airbag and the right fastener.

The upper outer belt is separable from the first belt at the right fastener and the left fastener during deployment of the front airbag and the rear airbag while maintaining an integrity of the upper outer belt and the first belt. For this purpose, each of the right fastener and the left fastener includes a first portion connecting the inner belt and a second portion connecting the upper outer belt, the first portion being connected to the second portion by a frangible connection that breaks away in response to a deployment force of the airbags.

According to another embodiment of the present invention, the crash protection system further includes an upper outer belt comprising a left upper outer belt connected between a left side of the front airbag and a left side of the rear airbag, and a right upper outer belt connected between a right side of the front airbag and a left side of the rear airbag. The upper outer belt retains the front airbag and rear airbag proximate a front and rear of the rider when the airbags are deployed.

According to yet another embodiment of the present invention, the front airbag module is an upper front airbag module with an upper airbag and the rear airbag module is an upper rear airbag module with an upper rear airbag, and the crash protection system further includes a lower front airbag module arranged proximate a front end of the base and having a lower front airbag, and a lower rear airbag module arranged proximate a rear end of the base and having a lower rear airbag. The upper front airbag is deployed upward from the base and in front of the rider when the upper front airbag module is actuated, the upper rear airbag is deployed upward from said base and in back of the rider when the upper rear airbag module is actuated, the lower front airbag is deployed downward from the base and in front of the rider when the lower front airbag module is actuated, and the lower rear airbag is deployed downward from the base and in back of the rider when the lower rear airbag module is actuated.

According to a specific embodiment of the present invention, the base is a motorcycle seat. Alternatively, the base comprises a portion of the motorcycle seat and is released from another portion of the seat upon determination of a crash situation. The present invention is not limited to motorcycles. The seat may also be used on snowmobiles or any other open vehicles from which a rider may be thrown or otherwise separated. Moreover, the present invention may also be used for riders of animals such as horses. In one example, the base is part of a saddle and is separable from the saddle. Accordingly, the invention protects a rider that is thrown from a horse or other animal.

In an additional embodiment, the crash protection device includes an elector that pushes the base away from the support upon release of the base from the support.

In a particular embodiment of the present invention, the belt system includes a front right strap connected to a front right side of the base, a rear right strap connected to a rear right side of the base, a front left strap connected to a front left side of the base, and a rear left strap connected to a rear left side of the base. The front right strap is reeved through a front right pulley and connected to a portion of a right fastener, the rear right strap is reeved through a rear right pulley and connected to another portion of the right fastener, the front left strap is reeved through a front left pulley and connected to a portion of a left fastener, and the rear left strap is reeved through a rear left pulley and connected to another portion of the left fastener. The front right pulley is connected to the front left pulley by a front portion of the first belt, and the rear right pulley is connected to the rear left pulley by a rear portion of the first belt. When the rider moves off of or away from the base, such as in a crash situation, the first belt tightens around the rider's body.

At least one of the front right strap, the front left strap, the rear right strap, and the rear left strap is connected to the base by a retractor mechanism. This retractor mechanism may be any known or hereafter developed retractor mechanism that is used with automotive seat belts.

The sensors of the control system include a tension sensor on the at least one of the front right strap, the front left strap, the rear right strap, and the rear left strap.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
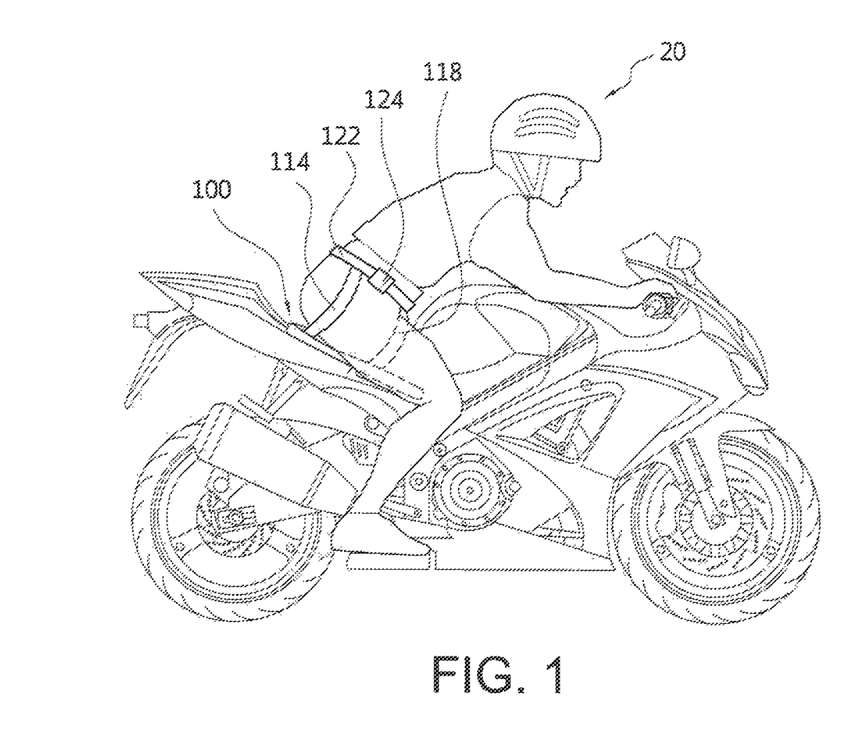
FIG. 1 is a side view of a rider on a motorcycle with a protection system according to an embodiment of the present invention.
Figures 2A, 2B:
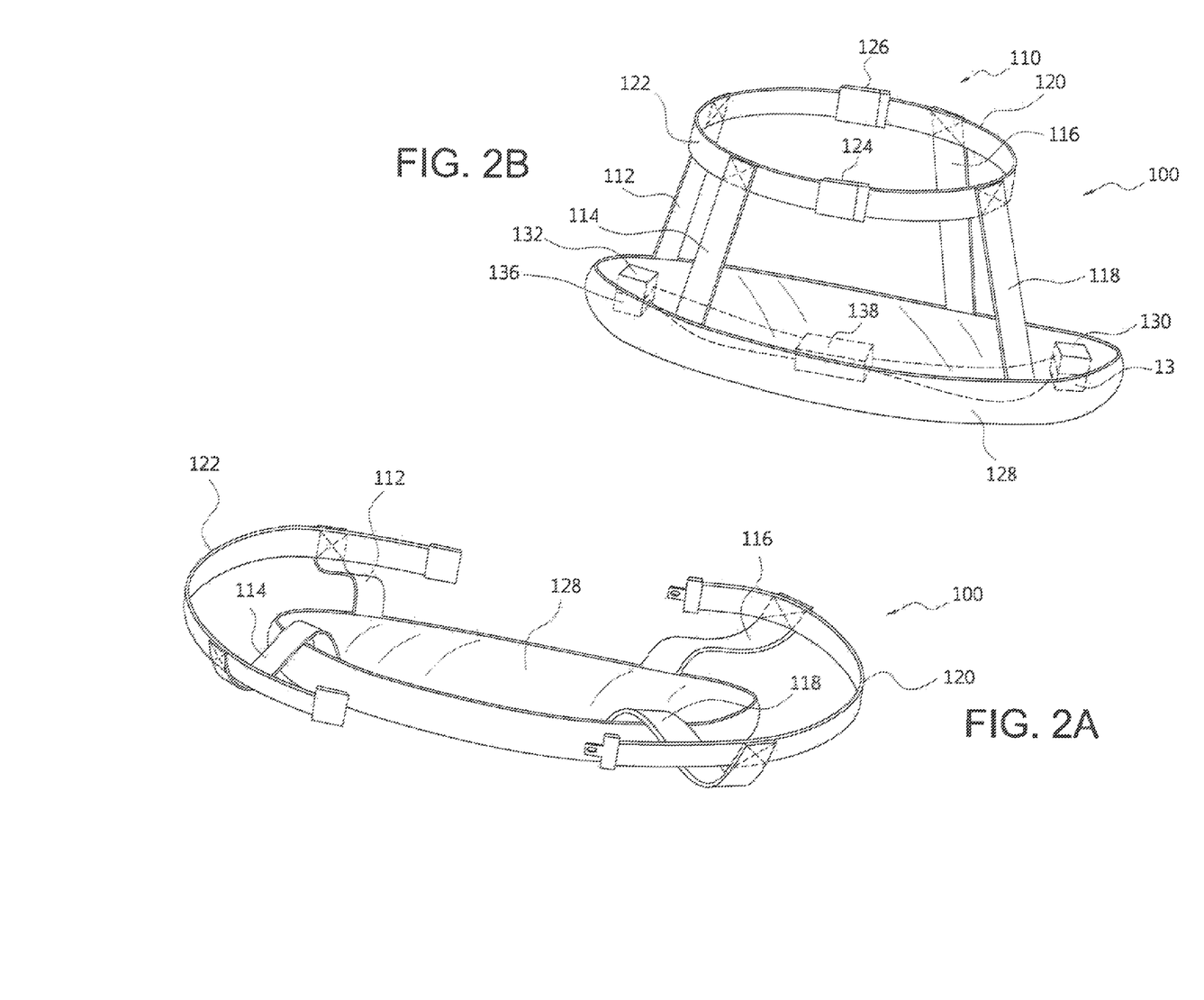
FIG. 2A is a schematic diagram showing a seat of the motorcycle according to an embodiment of the present invention with the belt unbuckled.
FIG. 2B is a schematic diagram of the seat of FIG. 2A showing the airbag modules.

FIG. 1 shows a rider 20 on a motorcycle 10 equipped with a protection system 100 according to an embodiment of the present invention. Further details of the protection system 100 are shown in FIGS. 2A and 2B, which show that a seat 128 of the motorcycle includes front airbag modules 130, 134 and rear airbag modules 132, 136 disposed within the seat. Each of the airbag modules 130, 132, 134, 136 is connected to a controller 138, which is depicted in the seat 128. Although, the controller 138 is depicted as being disposed in the seat, the controller 138 can be located at any convenient location on the motorcycle. The controller 138 is described in more detail below.

Furthermore, the seat 128 is attached to the rider 20 by straps 112, 114, 116, 118 and inner belt 110. The inner belt 110 includes an inner belt front portion 120 and an inner belt rear portion 122, which are connected to each other by buckles 124 and 126 or other known or hereafter developed releasable fasteners. As shown in FIG. 2A, before a rider 20 mounts the motorcycle 10, the buckles 124, 126 are opened. The rider sits on the seat so that the rider's right leg is between the front right strap 118 and rear right strap 114, and the rider's left leg is between the front left strap 116 and the rear left strap 112. The rider pulls the inner belt front portion 120 and inner belt rear portion 122 up around the rider's waist and attaches the buckles 124, 126. The straps 112, 114, 116, 118 may be connected to the seat by conventional methods such as sewing One or more of the straps 112, 114, 116, 118 may be connected to the seat 128 by a retractor mechanism and/or a pretensioner that are currently used with automotive seatbelts.

Figure 3:
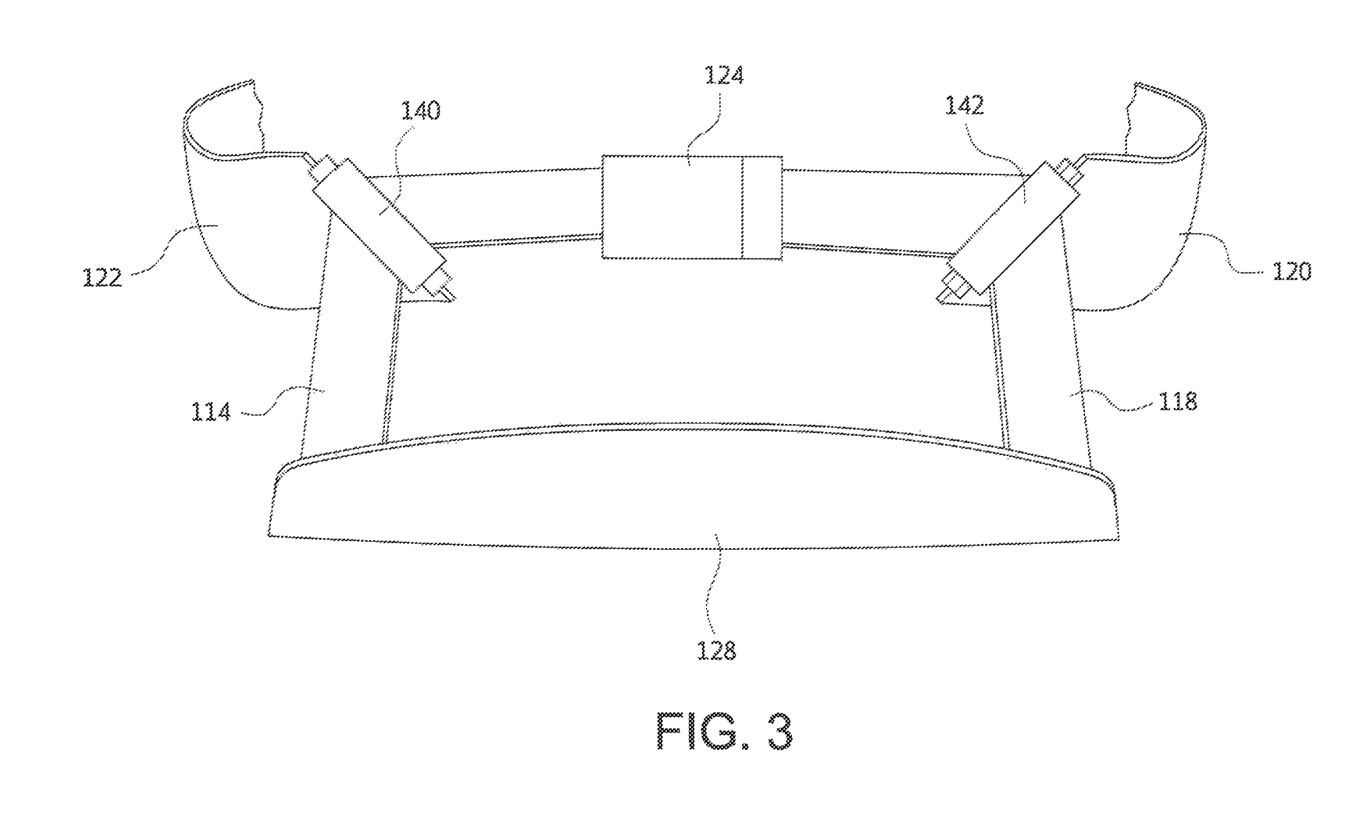
FIG. 3 is a schematic diagram of an inner belt according to an embodiment of the present invention.

FIG. 3 shows another embodiment of the present invention in which the inner belt 110 is connected to the straps 114 and 118 via pulleys 140, 142. In this embodiment, a belt forming the strap 114 is reeved through pulley 140 and is connected to the fastener 124. Likewise, the belt forming strap 118 is reeved through pulley 142 and connected to the fastener 124. The front and back portions of the inner belt are connected to the axles of the pulleys 140, 142. A similar configuration is disposed on the left side of the seat 128. Accordingly, as the rider lifts up from the seat, the straps 114, 118 lengthen and the inner belt 110 shortens. FIG. 3 further shows that the straps 114, 118 are each connected to the seat 128 by a retractor mechanism 141, 143. Similarly, the straps 112 and 116 may also be connected to the seat by retractor mechanisms.

Figure 4:
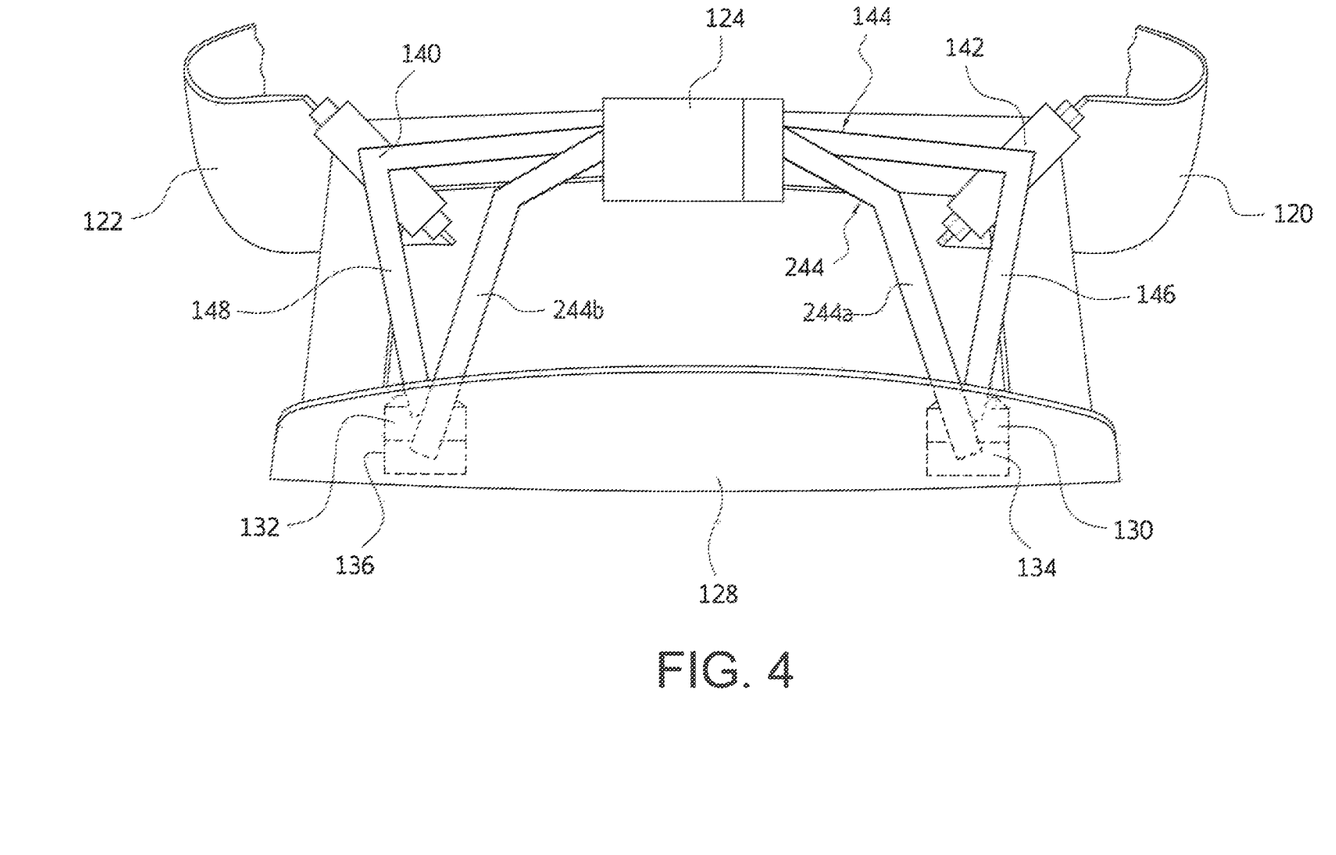
FIG. 4 is a schematic diagram of an inner belt and two outer belts according to an embodiment of the present invention.
Figure 5:
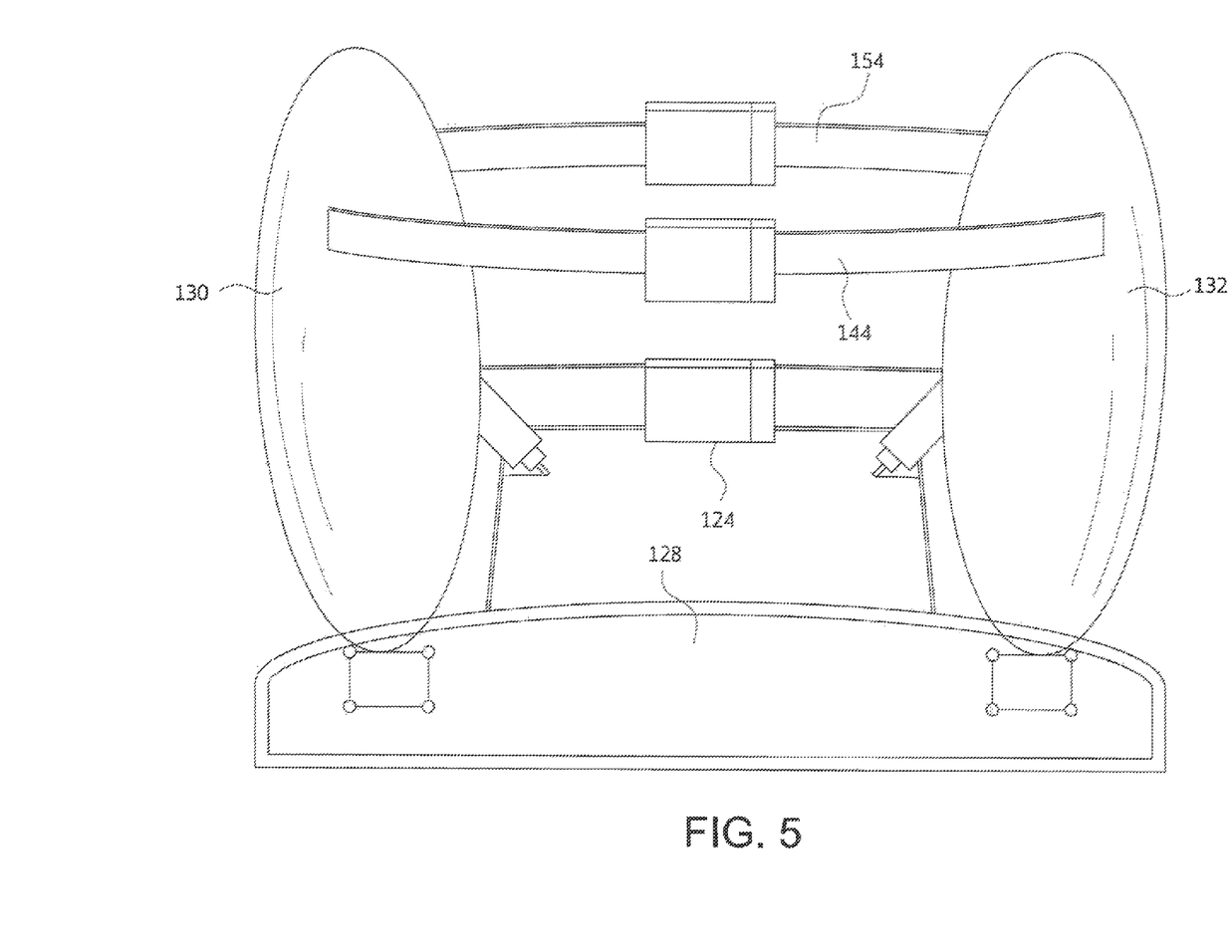
FIG. 5 is a schematic diagram of the protection system showing a deployed position of the upper airbags.

FIG. 4 shows another feature of the present invention. An upper right outer belt 144 has an outer belt front portion 146 connected on the right side of an airbag 130a in airbag module 130 and an outer belt rear portion 148 right side of an airbag 132*a* in airbag module 130. The outer belt front portion 146 is connected to the outer belt rear portion 148 by an outer belt fastener 150. A left outer belt 154 (not shown in FIG. 4) with a similar construction is connected to the left side of the air bag 130*a* and left side of airbag 132*a* in the seat 128. The outer belt 144 facilitates keeping the air bags 130*a* and 132*a* proximate the rider during deployment of the air bags. As shown schematically in FIG. 5, the deployed air bags 130*a* and 132*a* remain connected to each other by the outer belts 144 and 154 when they are deployed. This connection keeps the airbags 130, 132 proximate the rider during deployment for maximum protection. Similarly, a lower outer belt 244 having front and rear portions 244*a*, 244*b* and a buckle 151 is connected to the right side of airbags 134*a*, 136*a* in airbag modules 134, 136. The right lower outer belt 244 and left lower outer belt (not shown in FIG. 4) facilitate keeping the air bags 134*a*, 136*a* proximate the rider's legs during deployment.

Connections of the belts 144, 154 to the airbags may be accomplished by both adhesives and/or stitching. In one embodiment, the belt ends overlap and/or meet at the front or back so that a continuous loop is formed around the airbags for increased strength and thereby minimizing strain on the airbag fabric.

Figure 4A:
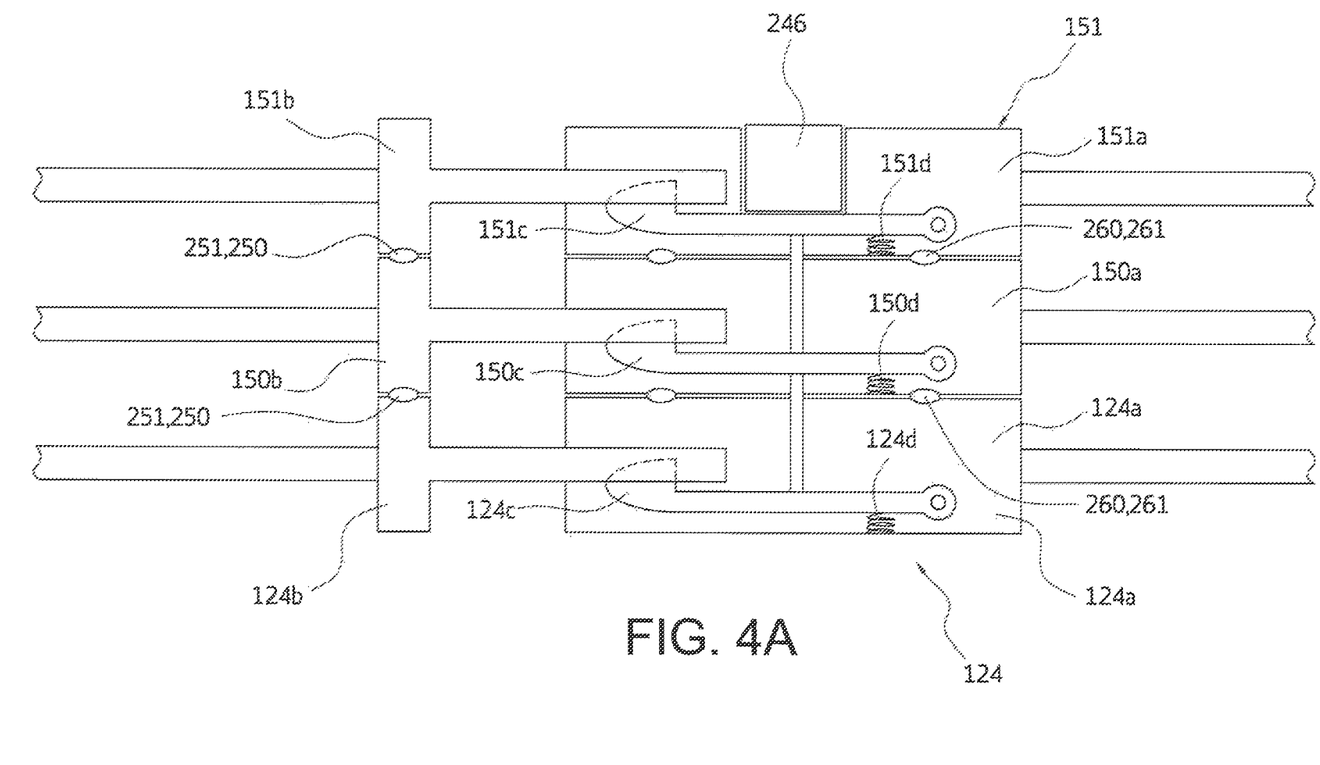
FIG. 4A is a schematic sectional diagram of the buckle according to an embodiment of the present invention.

FIG. 4A shows a sectional schematic view of the buckles 124, 150 and 151. Each of the buckles includes a male part 124*b*, 150*b*, 151*b* and a female part 124*a*, 150*a*, 151*a*. Each female part includes a releasable latch 124*c*, 150*c*, 151*c* for releasably engaging the respective male part, as in any conventional buckle. The male parts 124*b*, 150*b*, 151*b* are connected by frangible connections 250. Similarly, the female parts 124*a*, 150*a*, 151*a* are connected by frangible connections 260. The buckles can be operated simultaneously via pushbutton 246 and connectors 248. However, during deployment, the inner belt 110 and the two outer belts 144, 244 are required to separate from each other, while the buckles remain closed. The frangible connections allow the separation of the belts from each other. In general, the frangible connections 250, 260 should be strong enough to maintain the connection of the buckles during normal handling and weak enough to separate in response to the deployment of the airbags. If the portions of the buckles that are connected are plastic, the frangible connection may comprise small connection areas. If the portions of the buckles that are connected are metal, the frangible connection may be a spot weld. Alternatively, the frangible connections 250, 260 may comprise hook and loop fasteners such as VELCRO™. As a further alternative, a releasable magnetic lock 251, 261 may be used instead of the frangible connections 250, 260. The magnetic lock may work on the principle of magnetic door lock devices known, for example, from U.S. Pat. No. 4,826,223, the entire contents of which are incorporated herein by reference. Each magnetic lock includes an electromagnet 166 controlled by the controller (see FIG. 6) and an armature 167. In a preferred embodiment, the magnetic lock is fail-secure so that the magnetic lock does not accidentally release when no power is provided, such as in a low battery condition.

Figure 6:
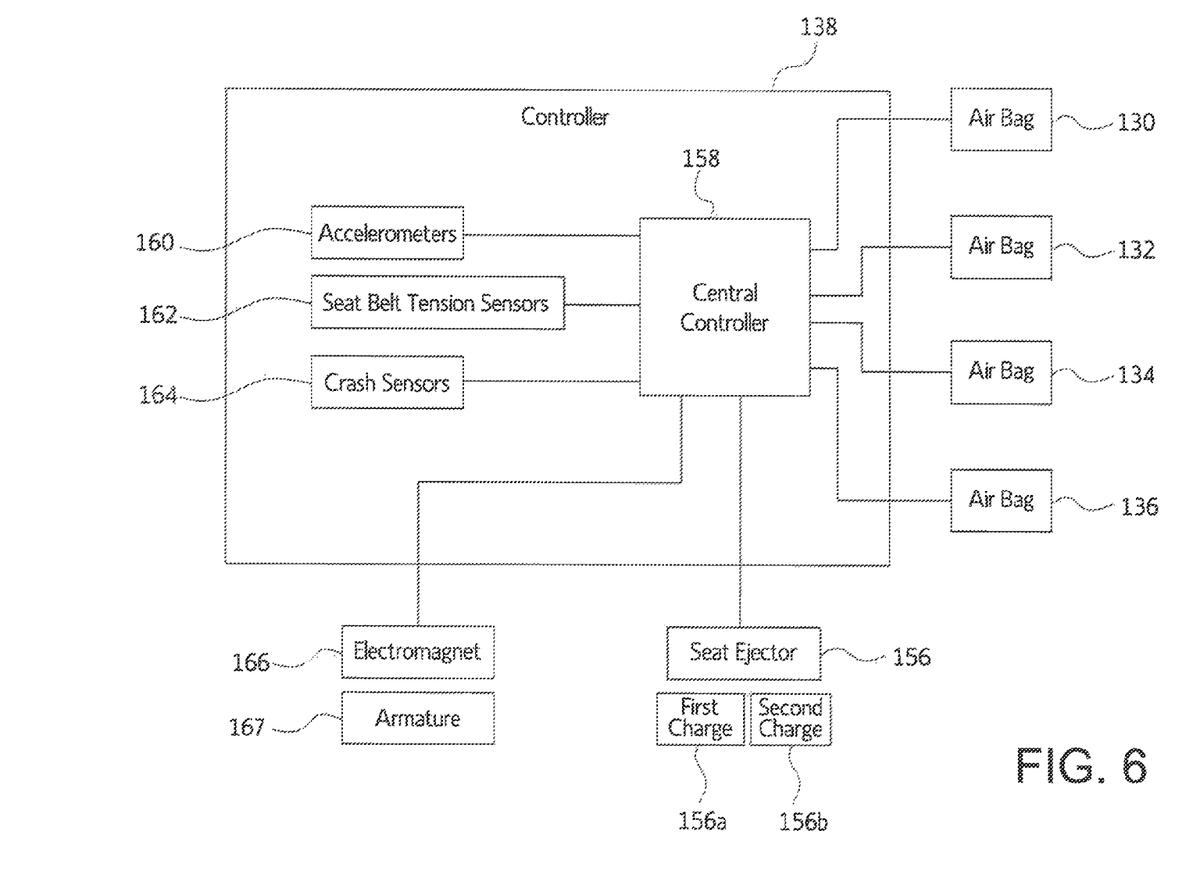
FIG. 6 is a block diagram of the control system according to an embodiment of the present invention.

According to FIG. 6, the controller 138 includes a central controller 158 connected to accelerometers 160, seatbelt tension sensors 162, and other crash sensors 164 such as speed sensors and/or 3D position sensors. The accelerometers 160 may comprise 1D, 2D, and/or 3D accelerometers, depending on the particular requirements. The present invention may also employ any known or hereafter developed safing sensors to ensure operational reliability.

Specific combinations of sensor signals will be recognized by the central controller 158 as a crash situation requiring actuation of the airbag modules 130, 132, 134, and 136. In one example, a crash situation occurs when at least one of the sensors 160, 162, 164 indicates a front collision at greater than a predetermined speed. Other crash situations may include when the vehicle is tilting and a rider is falling off of the vehicle, when the vehicle is hit from behind, and when the vehicle is hit from the side. In the first scenario, the sensors would sense a speed of the vehicle and the accelerometers would sense that the vehicle is tilting. If the tilt occurs to a degree that is outside of a normal operation at the sensed speed, deceleration or acceleration by a predetermined amount, the airbag modules 130, 132, 134, and 136 would deploy. For the rear and side impacts, the accelerometers would sense that which is considered to be unusual accelerations.

Figure 9:
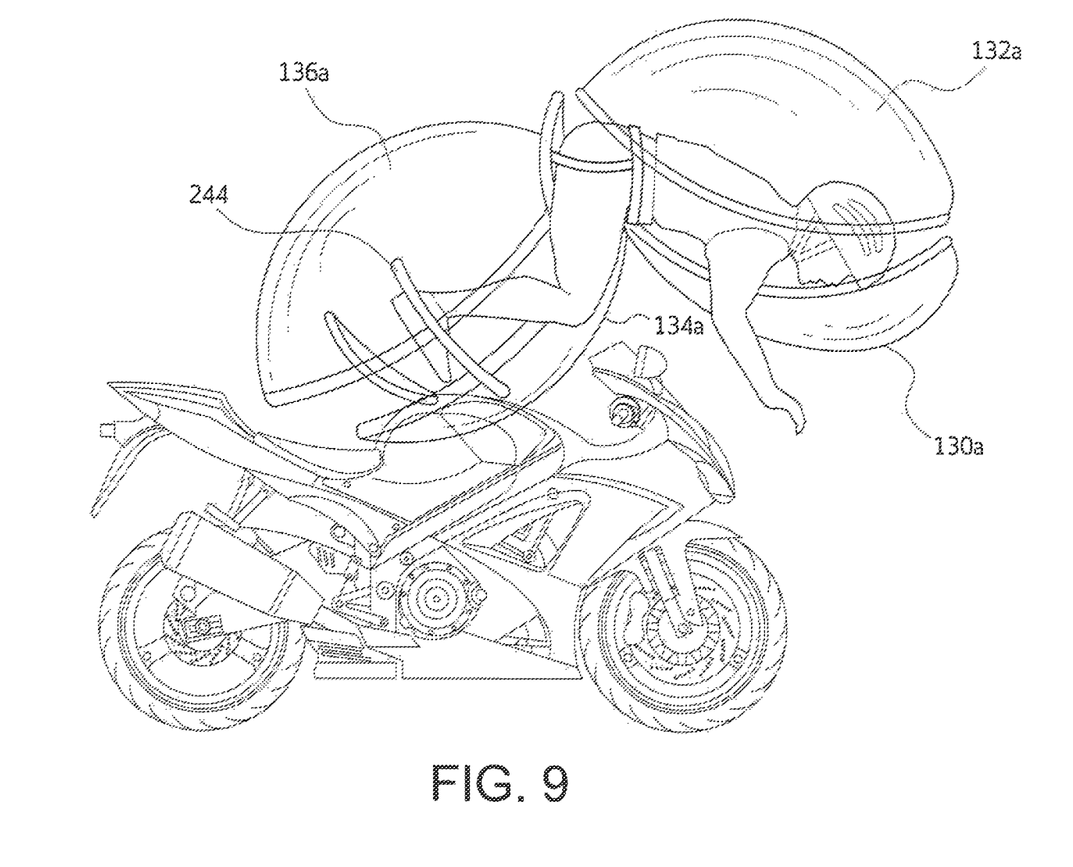
FIG. 9 is a side view of the motorcycle with the upper air bags and the lower air bags deployed.

Once a crash situation is recognized, the central controller 158 actuates a seat ejector 156, which releases the seat 128, or at least a portion of the seat 128 from the motorcycle 10 (see FIG. 7). The seat ejector 156 may simply comprise a latch that is released upon detection of a crash situation so that the seat is released from the motorcycle. Alternatively, the ejector may further include an energy storage unit such as a spring that urges the seat 128 away from the motorcycle after the latch is released. As a further alternative, the seat ejector may have a variable force that takes into account anticipated impact and weight of rider upon detection of a crash situation. Here, the ejector 156 may comprise an explosive cartridge, similar to the explosive cartridges used for ejection seats in aircraft. To achieve a variable force, two or more explosive cartridges of different charges, i.e., a first charge 156*a* and a second charge 156*b* may be used Simultaneously with the actuation of the seat ejector 156, or with a nominal delay, the central controller 158 actuates the air bag modules 130, 132, 134, and 136. According to one embodiment of the invention, the upper air bags 130*a*, 132*a* are deployed first as shown in FIG. 8. After a small delay, the lower airbags 134*a*, 136*a* are deployed as shown in FIG. 9. As an alternative, all of the airbags 130*a*, 132*a*, 134*a*, 136*a* may be deployed simultaneously. Each of the air bags 130*a*, 132*a*, 134*a*, 136*a* is deployed with a respective conventional airbag inflator (not shown) as is used for automotive airbags.

Figure 10:
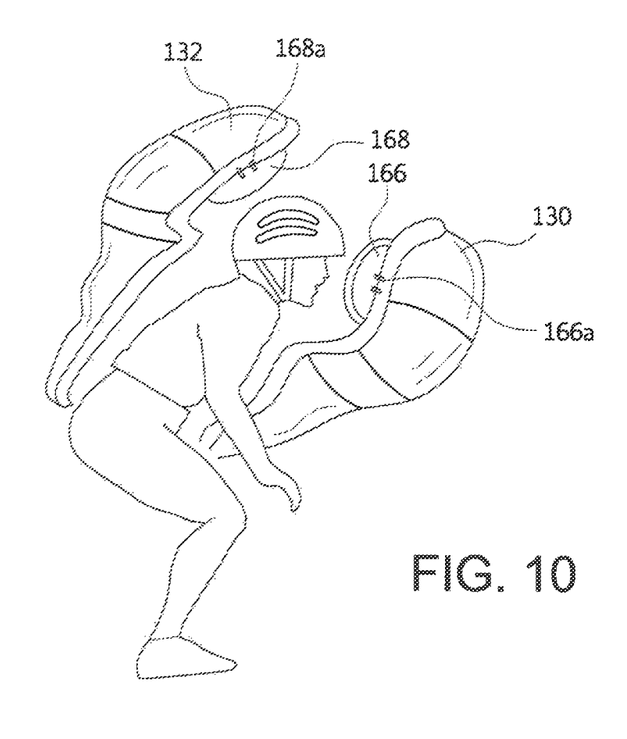
FIG. 10 is a schematic diagram showing internal features of the upper airbags.

As shown in FIG. 10, the airbags 130*a*, 132*a* have internal webs or strings connecting the walls of the respective air bags 130*a*, 132*a* so that the air bags are deployed in the proper shape. The upper front airbag is shaped so that it has a height that extends over a top of a head of a typical rider and will arch back over the top of the rider's head. The depth of the inflated airbag 130*a* from front to back is large enough so that it is greater than a length of the rider's arms.

The upper rear airbag 132*a* also has a height that extends over a top of a head of a typical rider and will arch over the rider's head and meet the top of the upper front airbag 130*a*. Further, the upper rear airbag designed to curve around a back of the rider toward the front and cover sides of the rider (see, e.g., FIG. 11). The outer belt 144 will facilitate maintaining the airbags 130*a*, 132*a* in place around the rider.

Similarly, the lower front and rear airbags 134*a*, 136*a* are shaped to cover the rider's legs. More specifically, the lower airbags are shaped and deployed to cover the typical riding position of the legs.

Figure 11:
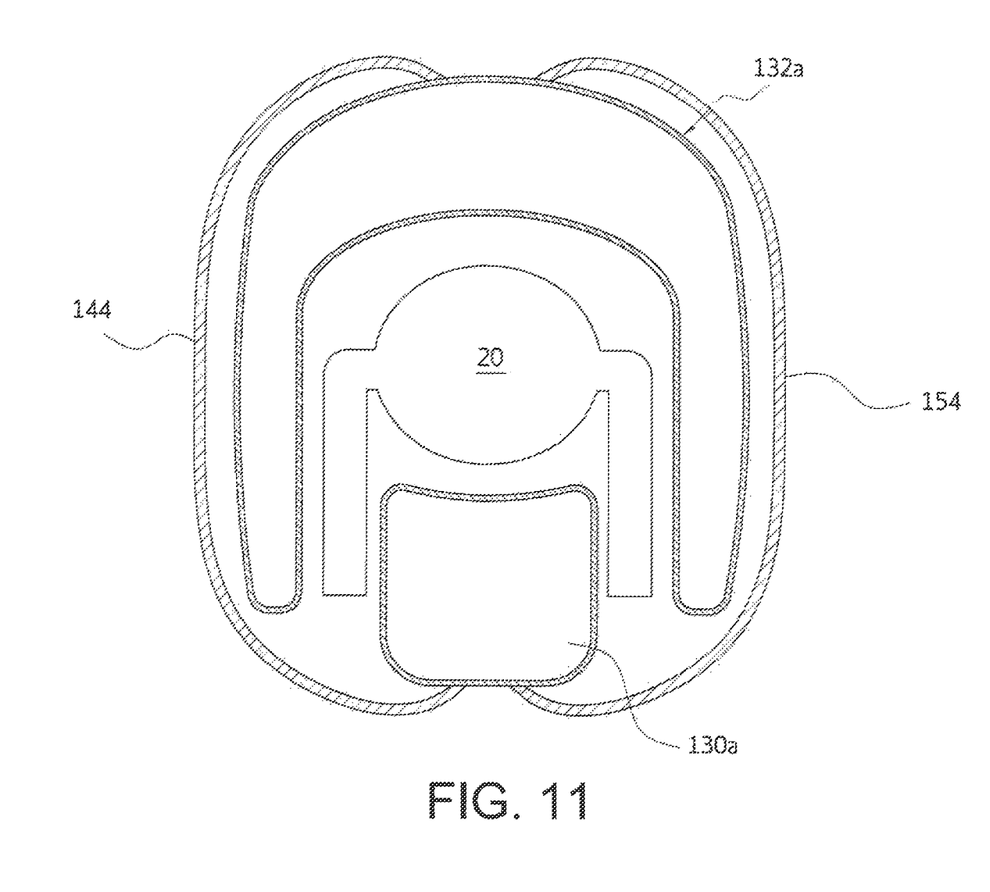
FIG. 11 is a schematic top view of the deployed upper air bags.
Figure 12A:
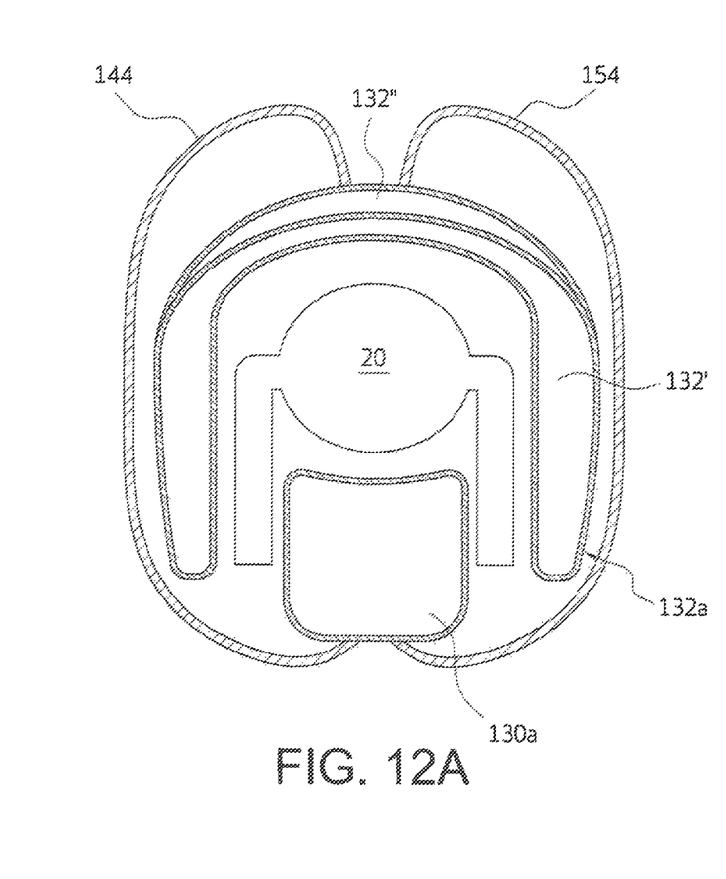
FIGS. 12A and 12B are schematic top view diagrams of two stages of deployment of the upper air bags.
Figure 12B:
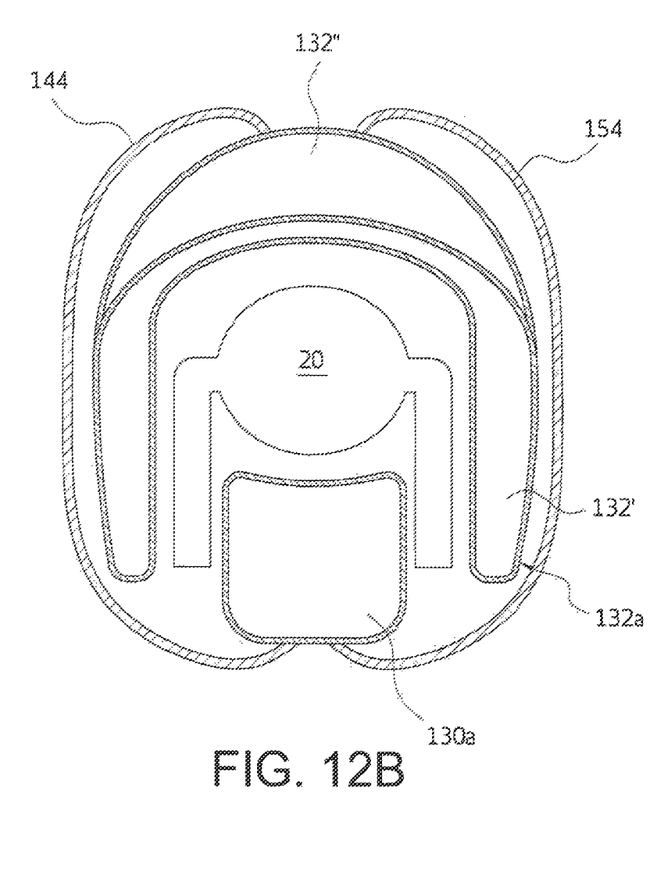

Furthermore, the air bags 130*a*, 132*a* may include a number of different internal chambers that are separated by valves. For example, FIG. 10 shows portions 166, 168 in the areas facing the riders head. These portions 166, 168 are separated from the remainder of the airbag volume by respective valves 166*a*, 168*a*, which are dimensioned so that portions remain softer than the remainder of the air bags during a predetermined time period after deployment. As an alternative, separate inflators may be used for each internal chamber. Accordingly, the initial, impact of the drivers head is further cushioned during this time period, FIG. 11 shows how the upper outer belts 144, 154 are secured to the airbags 130, 132. According to an embodiment of the invention shown in FIGS. 12A and 12B, the rear upper air bag 132 includes an inner chamber 132' and an outer chamber 132". The inner chamber 132' inflates first so that the outer beats. 144, 154 can easily move upward as the airbags are deployed, then the outer chamber 132" inflates to tighten the outer belts, which causes the airbags 130, 132 to be urged toward or held close to the rider.

Thus, while there have shown and described and pointed out fundamental novel of the invention as applied to a preferred embodiment thereof, it will be understood that various omissions' and substitutions and changes in the form and details of the devices illustrated, and in their operation, may be made by those skilled in the art without departing from the spirit of the invention. For example, it is expressly intended that all combinations of those elements, which perform substantially the same function in substantially the same. Way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A crash protection system, comprising:
 a seat connectable to a support the seat configured to rest beneath a rider;
 a front airbag module disposed within said seat proximate a front end of said seat and comprising a front airbag;
 a rear airbag module disposed within said seat proximate a rear end of said seat and comprising a rear airbag;
 a belt system including a first belt configured to encircle a waist of the rider and at least one strap directly connecting said first belt to said seat;
 a control system including sensors, said control system configured to monitor said sensors to detect whether a crash situation is present and said control system configured to actuate said front airbag module and said rear airbag module and release at least a portion of said seat from said support when the crash situation is detected, wherein said front airbag is deployed upward from said seat and configured to be in front of the rider when said front airbag module is actuated, and said rear airbag is deployed upward from said seat and configured to be behind the rider when said rear airbag module is actuated.

2. The crash protection system of claim 1, wherein said first belt includes a front first belt portion and a rear first belt portion, the front first belt portion is connectable to the rear first belt portion by a right fastener and a left fastener, wherein said front first belt portion is connected to said seat by a right front strap and a left front strap, and said rear first belt portion is connected to said seat by a right rear strap and a left rear strap, said right fastener arranged between said right front strap and said right rear strap on a right side of said seat and said left fastener arranged between said left front strap and said left rear strap on a left side of said seat.

3. The crash protection system of claim 2, further comprising an upper outer belt comprising a front left upper outer belt connected to a left side of said front airbag and said left fastener, a front right upper outer belt connected to a right side of said front airbag and said right fastener, a rear left upper outer belt connected to a left side of said rear airbag and said left fastener, and a rear right upper outer belt connected to a right side of said rear airbag and said right fastener.

4. The crash protection system of claim 3, wherein said upper outer belt is separable from said first belt at said right fastener and said left fastener during deployment of said front airbag and said rear airbag.

5. The crash protection system of claim 3, wherein each of said right fastener and said left fastener includes a first portion connecting said right fastener and said left fastener to said first belt and a second portion connecting said right fastener and said left fastener to said upper outer belt, said first portion being connected to said second portion by a frangible connection that is configured to break away in response to a deployment force of said airbags.

6. The crash protection system of claim 1, further comprising an upper outer belt comprising a left upper outer belt connected between a left side of said front airbag and a left side of said rear airbag, and a right upper outer belt connected between a right side of said front airbag and a right side of said rear airbag, said upper outer belt configured to retain said front airbag and said rear airbag proximate a front and a rear of the rider, respectively.

7. The crash protection system of claim 1, wherein said front airbag module is an upper front airbag module and said front airbag is an upper front airbag and said rear airbag module is an upper rear airbag module and said rear airbag is an upper rear airbag, said crash protection system further comprising:
 a lower front airbag module disposed within said seat proximate the front end of said seat and comprising a lower front airbag; and
 a lower rear airbag module disposed within said seat proximate the rear end of said seat and comprising a lower rear airbag.

8. The crash protection system of claim 7, wherein said upper front airbag is deployed upward from said seat and configured to be in front of the rider when said upper front airbag module is actuated, said upper rear airbag is deployed upward from said seat and configured to be behind the rider when said upper rear airbag module is actuated, said lower front airbag is deployed downward from said seat and configured to be in front of said rider when said lower front airbag module is actuated, and said lower rear airbag is deployed downward from said seat and configured to be behind the rider when said lower rear airbag module is actuated.

9. The crash protection system of claim 1, wherein said seat comprises a motorcycle seat.

10. The crash protection system of claim 1, further comprising an ejector configured to push said seat away from the support upon release of said seat from the support.

11. The crash protection system of claim 1, wherein said at least one strap of said belt system includes a front right strap connected to a front right side of said seat, a rear right strap connected to a rear right side of said seat, a front left strap connected to a front left side of said seat, and a rear left strap connected to a rear left side of said seat.

12. The crash protection system of claim 11, wherein said front right strap is reeved through a front right pulley and connected to a portion of a right fastener, said rear right strap is reeved through a rear right pulley and connected to another portion of said right fastener, said front left strap is reeved through a front left pulley and connected to a portion of a left fastener, and said rear left strap is reeved through a rear left pulley and connected to another portion of said left fastener;

said front right pulley is connected to said front left pulley by a front portion of said first belt; and     said rear right pulley is connected to said rear left pulley by a rear portion of said first belt.

13. The crash protection system of claim 11, wherein at least one of said front right strap, said front left strap, said rear right strap, and said rear left strap is connected to said seat by a retractor mechanism.

14. The crash protection system of claim 11, wherein said sensors of said control system include a tension sensor on at least one of said front right strap, said front left strap, said rear right strap, and said rear left strap.

\* \* \* \* \*